No. 887,902. PATENTED MAY 19, 1908.
L. F. ADT.
EYEGLASSES.
APPLICATION FILED OCT. 19, 1906.
2 SHEETS—SHEET 1.
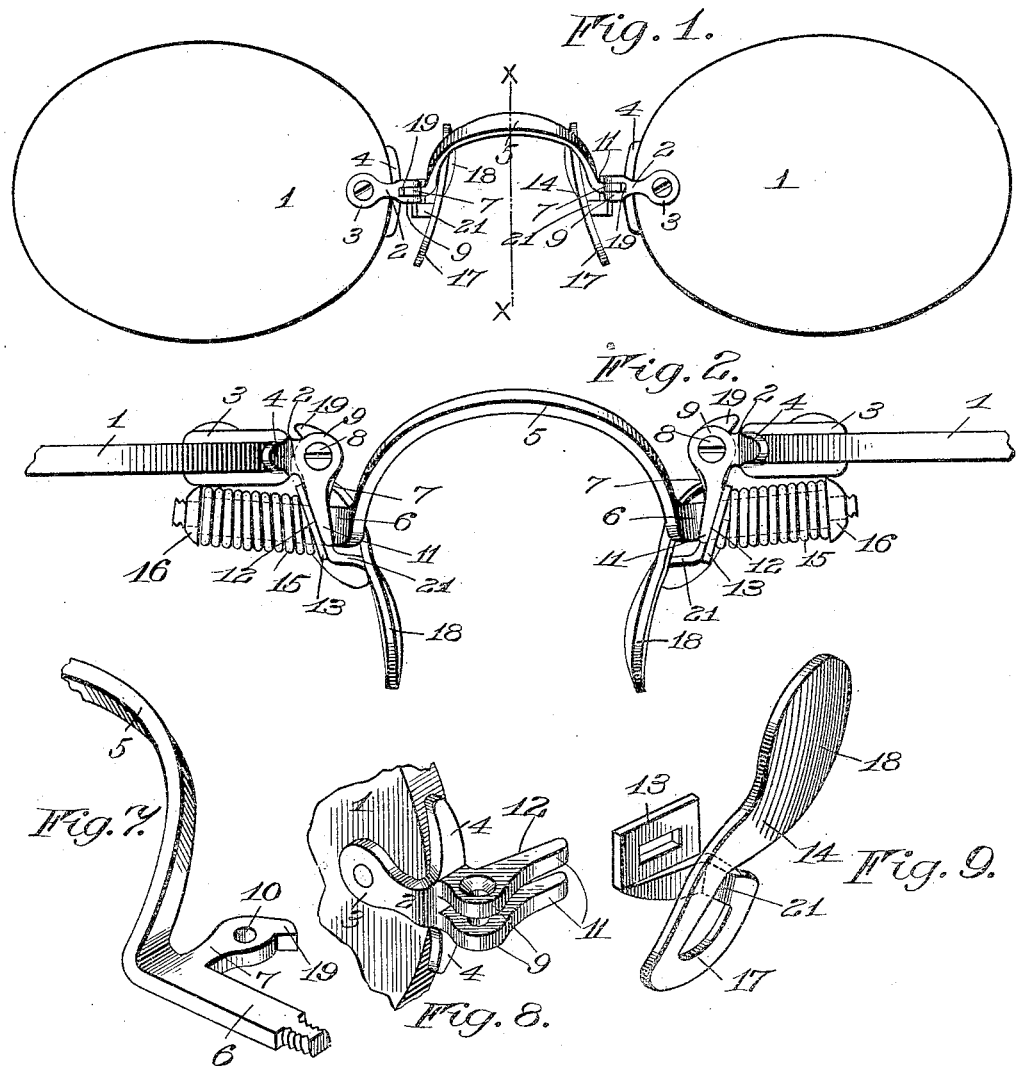

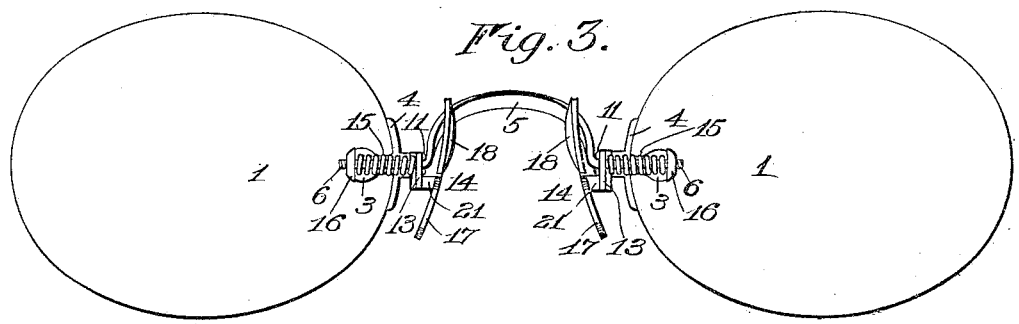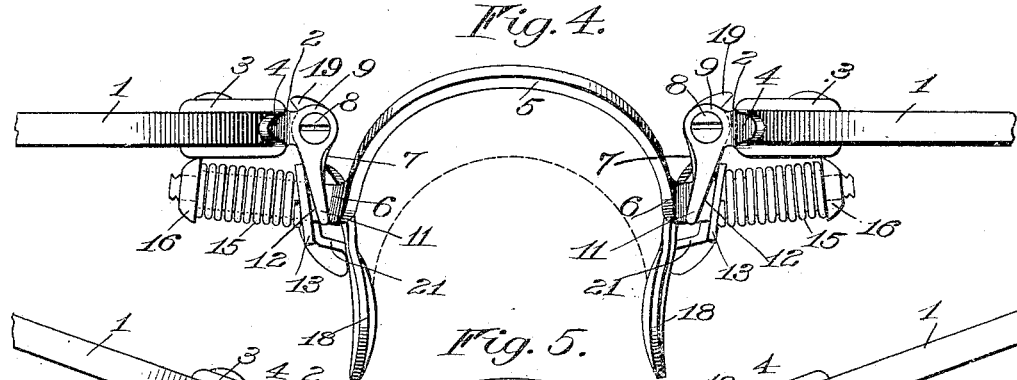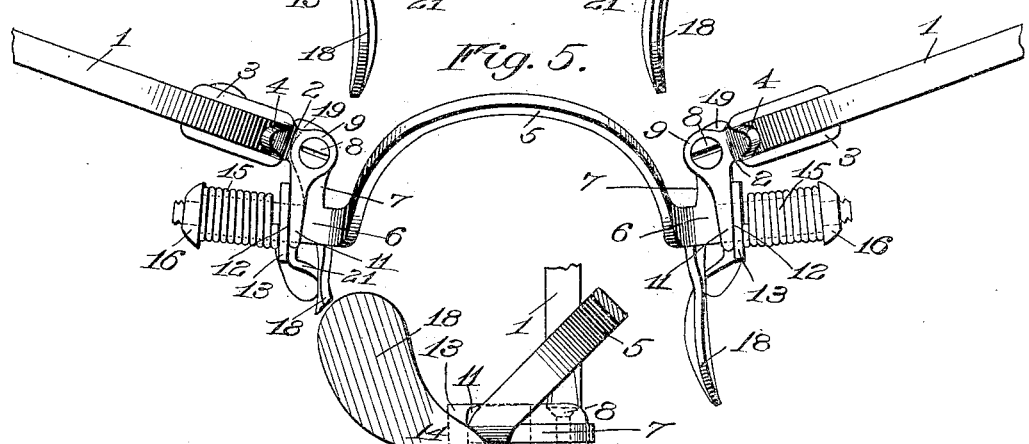

UNITED STATES PATENT OFFICE.

LEO F. ADT, OF ALBANY, NEW YORK.

EYEGLASSES.

No. 887,902.     Specification of Letters Patent.     Patented May 19, 1908.

Application filed October 19, 1906. Serial No. 339,624.

*To all whom it may concern:*

Be it known that I, LEO F. ADT, of Albany, in the county of Albany and State of New York, have invented certain new and useful Improvements in Eyeglasses; and I do hereby declare the following to be a full, clear, and exact description of the same, reference being had to the accompanying drawings, forming a part of the specification, and to the reference-numerals marked thereon.

My present invention relates to eyeglasses and has for its objects to provide a mounting particularly adapted for rimless glasses and embodying a rigid bridge to which the lens grips and nose guards are so connected that the guards may be separated for applying and removing the glasses from the wearer's nose, by a movement of the lenses in a horizontal plane and the guards are permitted a yielding movement independently of the lenses, the movements of each guard and lens grip relative to one end of the bridge being controlled by a single spring which is readily applied and is of such nature that it is not liable to be unduly strained or its action impaired by continuous use.

It has further for its object to provide a mounting which is extremely simple in construction and operation and is quite inconspicuous, none of the operating parts being visible when the glasses are in position upon the wearer's nose.

To these and other ends the invention consists in certain improvements and combinations of parts all as will be hereinafter more fully described, the novel features being pointed out in the claims at the end of the specification.

In the drawings: Figure 1 is a front elevation of a pair of eyeglasses embodying my invention. Fig. 2 is a plan view. Fig. 3 is a rear elevation. Fig. 4 is a plan view of the glasses when in position on the wearer's nose. Fig. 5 is a plan view showing the manner of separating the nose guards by the forward movement of the lenses. Fig. 6 is a sectional view on the line $x$—$x$ of Fig. 1. Fig. 7 is a perspective view of one end of the bridge. Fig. 8 is a similar view of one of the lens grips, and Fig. 9 is a similar view of a nose guard.

Similar reference numerals in the several figures indicate similar parts.

The lenses 1 are of the usual construction having at their inner proximate edges lens grips or clamps 2 provided in the present instance with the usual perforate lugs 3 extending over the faces of the lenses and with the lens edge-bearing lugs 4. The bridge or connecting portion 5 of the mounting is formed of relatively rigid material having the central arched portion adapted to extend over the wearer's nose and to rest thereon and the extensions 6 forming ways or guides in rear of the attaching lugs of the lens grips and preferably in substantially the same horizontal plane as the latter. Between the arched portion and the extensions or guides 6 of the bridge, there are provided forwardly extending lugs or arms 7 to which the lens grips are pivotally connected, these pivotal connections being preferably in line with the lens edge and formed in the present instance by screws or pivot pins 8 passing through and secured to suitable apertures in lugs 9 on the lens grips and loosely through the perforations 10 in the arms 7 on the bridge. The lugs 9 on the lens grips are elongated toward the rear of the lenses and form arms 11 extending transversely of the bridge extensions their inner proximate sides abutting the lower ends of the arch which form stops limiting the movement of the lenses on the pivots and maintaining them in alinement, as shown in Fig. 3. The outer sides of the arms 11 are inclined slightly, as shown at 12, forming seats for the plates 13 forming part of or attached to the nose guards 14, and apertured for the passage of the extended ends or guides on the bridge which passes through them.

15 indicates small coil springs encircling the guides on the bridge, abutting the guard plates 13 at one end and at their outer ends confined by suitable means such as nuts 16 applied to the threaded ends of the bridge extensions.

The nose guards may be of any suitable configuration, but I prefer to make them of a single piece of flat sheet metal reinforced by or integral with, the plates 13 and having the lower loops 17 and the upwardly and rearwardly extending pads or arms 18. The apertures in the guards or plates through which the guides pass, are large enough to not only permit the guards to slide freely longitudinally thereon when they are separated by the forward movement of the lenses as in Fig. 5, but also to permit the guards to yield independently of the bridge and lenses and grip the wearer's nose by spring pressure, as shown in Fig. 4.

The operation of the mounting will now be readily understood, the normal position of the parts being as shown in Fig. 2, the springs holding the guards against the arms 9 and the latter against the stops formed by the lower ends of the arched portion of the bridge. To apply the glasses the outer ends of the lenses are tilted forwardly, as in Fig. 5, and the guards moved outwardly on the bridge ends against the tension of the springs and widely separated for application to the wearer's nose, the movement of the lenses on the bridge being limited by suitable stops such as the lugs 19 which engage the forward edges of the lens grips in the present construction. When the glasses are properly positioned the lenses are released and the springs pressing on the guard plates not only hold the guards yieldingly against the nose of the wearer, but also hold the forward edges of the guard plates 13 against the arms 11 of the lens grips, and the latter against the stops formed by the arched portion of the bridge so that the lenses are maintained in proper alinement, although the guards are permitted an independent yielding movement to accommodate themselves to the nose, as shown in Fig. 4.

While the particular construction of the holding pads on the guards is not essential to the operation of my mounting, it is desirable that they be offset somewhat from the plates 13, as by means of the supporting arm 21, so that their bearing surfaces or pads may form substantial continuations of the inner surface of the arch or saddle portion of the bridge, thus allowing the latter to come in contact with the wearer's nose and form a more secure bearing for the glasses.

By arranging the springs on the extensions of the bridge and in rear of the attaching lugs of the lens grips all of the operating parts of the mounting are concealed when the glasses are in position on the wearer's nose, thus rendering the glasses particularly sightly in appearance. The employment of two plain spiral springs for holding the lenses in position relative to each other and to the bridge, and also to hold the guards with a yielding pressure on the nose, materially simplifies the construction and enables the parts to be readily assembled by unskilled operators.

I claim as my invention:

1. In an eyeglass mounting, the combination with the bridge, of a lens grip pivoted thereto, a noseguard movable on the bridge a connection between the grip and the nose guard to cause the guard to move on the bridge with the grip and also to permit the guard to move independently of the grip and a single spring controlling the relative movements of the bridge, lens grip and guard.

2. In an eyeglass mounting, the combination with the bridge, of lens grips pivoted thereon, the opposing noseguards movable on the bridge a connection between the grip and the nose guard to cause the guard to move on the bridge with the grip and also to permit the guard to move independently of the grip and a single spring arranged between each end of the bridge and the corresponding nose guard and operating through the latter upon the lens grip.

3. In an eyeglass mounting, the combination of a bridge, lens grips pivoted thereon, longitudinally compressible coil springs mounted on the bridge and connection between the lens grips and the springs causing the compression of the springs when the grips are turned in one direction, and the movement of the grips in the other direction when the springs expand.

4. In an eyeglass mounting, the combination of the bridge, the lens grips pivoted thereon having the arms, and longitudinally compressible coil springs arranged between said arms and the bridge operating to turn the grips on their pivots in one direction.

5. In an eyeglass mounting, the combination of the lens grips, the bridge to which the grips are pivoted having the guides located in substantially the same horizontal plane as the latter, and springs on the extensions with which the grips engage.

6. In an eyeglass mounting, the combination with the bridge, of the lens grips pivoted thereon having the arms, and the compressible springs on the bridge with which the arms on the grips engage.

7. In an eyeglass mounting, the combination with the lens grips having the rearwardly extending arms, of the bridge pivoted to the grips and having the guides in rear thereof and the springs on the guides coöperating with the bridge and the arms on the grips.

8. In an eyeglass mounting, the combination with the bridge having the arched central portion and the guides or ways, of the lens grips pivoted to the bridge forward of said guides and having the arms extended over the latter and the springs on the guides with which the grip arms coöperate.

9. In an eyeglass mounting, the combination with the bridge having the guides thereon, of the lens grips pivoted to the bridge and having arms extending transversely of the guides, nose guards mounted to slide on said guides and engaging the grip arms and springs operating on the guards to move them toward each other.

10. In an eyeglass mounting, the combination with the bridge having the guides thereon, of the lens grips pivoted on the bridge, the nose guards sliding on the guides and the springs on the guides operating upon the guards and holding them in yielding engagement with the arms on the grips.

11. In an eyeglass mounting, the combination with the bridge having stops and guides thereon, of the lens grips pivoted to the bridge, the nose guards loosely mounted on the guides and springs on the guides for holding the guards against the grips and the latter against the stops.

12. In an eyeglass mounting, the combination with the bridge having stops and guides thereon, of the lens grips pivoted to the bridge, and having the arms, the nose guards movable upon the guides and engaging said arms and the springs on the guides coöperating with the guards, holding the arms in yielding engagement with the stops and permitting the independent tilting movement of the guards.

13. In an eyeglass mounting, the combination with the bridge having the guides, of the lens grips pivoted to the bridge, the guards movable on the guides and having pivotal engagement with the lens grips forwardly of the guides and springs operating upon the guards to proximate them and through the guards to hold the lens grips in position.

14. In an eyeglass mounting, the combination with the bridge having the guides and the forwardly extending lugs, of the lens grips pivoted to the lugs and having the arms extending past the guides and inclined on their outer sides, the nose guards mounted loosely on the guides and engaging the arms on the lens grips and the springs for holding the guards yieldingly against said arms.

15. In an eyeglass mounting, the combination with the bridge, of the lenses pivoted thereon, guides on the bridge in rear of the lenses, the nose guards movable longitudinally of the guides and engaging the lenses and springs for holding the guards in yielding engagement with the lenses and movable with and independently of the latter.

16. In eyeglasses, the combination with the bridge and the guides thereon, of the lens grips pivoted to the bridge forward of the guides and having portions extending over the latter, the nose guards loosely mounted on the guides and engaging said portions and springs on the guides operating the nose guards on the guides and the lens grips on their pivots.

17. The combination with the arched bridge having the forwardly extending lugs and the guides in rear thereof, of the lens grips pivoted to the lugs and having the rearwardly extending arms, the nose guards loosely encircling the guides and engaging the outer sides of the arms, the coil springs on the guides engaging the outer sides of the guards and abutments on the outer ends of the guides with which the springs coöperate.

18. In eyeglass mountings, the combination with the arched bridge having the forwardly extending lugs, the guides in rear thereof and stops at the outer ends of the latter, of the lens grips pivoted to the lugs and having the rearwardly extending arms passing above and below the guides, the nose guards mounted loosely on the guides and engaging the outer sides of the arms and coil springs encircling the guides and arranged between the guards and stops.

19. In eyeglasses, the combination with a bridge, of a lens mounted to swing relatively to the bridge, and a nose guard operated by the movement of the lens and mounted to turn independently thereof about a different axis.

LEO F. ADT.

Witnesses:
CHARLES S. ALDRICH,
ISABEL KELLEY.